United States Patent [19]

Kozima et al.

[11] Patent Number: 4,543,644
[45] Date of Patent: Sep. 24, 1985

[54] CONTROL CIRCUIT FOR MATRIX-DRIVEN RECORDING

[75] Inventors: Yasuyuki Kozima; Kunio Sato; Masaharu Tadauchi, all of Hitachi; Hiroshi Suehiro; Yasuo Inoue, both of Yokohama, all of Japan

[73] Assignee: Hitachi, Ltd., Tokyo, Japan

[21] Appl. No.: 416,245

[22] Filed: Sep. 9, 1982

[30] Foreign Application Priority Data

Sep. 11, 1981 [JP] Japan ............................... 56-142277

[51] Int. Cl.[4] .................................................. G06F 3/00
[52] U.S. Cl. ..................................... 364/900; 400/121; 400/124; 364/518; 346/78; 101/93.04
[58] Field of Search ... 364/200 MS File, 900 MS File, 364/518 44; 340/726, 731; 346/78; 400/83, 121, 124, 279; 101/93.04, 93.05

[56] References Cited

U.S. PATENT DOCUMENTS

| 4,323,896 | 4/1982 | Fiedler et al. | 340/800 |
|---|---|---|---|
| 4,392,197 | 7/1983 | Couper et al. | 364/200 |
| 4,435,776 | 3/1984 | Ratcliffe et al. | 364/900 |
| 4,445,114 | 4/1984 | Stubben | 340/726 |

Primary Examiner—James D. Thomas
Assistant Examiner—A. E. Williams, Jr.
Attorney, Agent, or Firm—Antonelli, Terry & Wands

[57] ABSTRACT

A control circuit is used for matrix drive recording. It includes a microprocessor, a RAM for storing data to be recorded therein, an address signal editing circuit for modifying the input addresses to the RAM, a shift register for converting the data from parallel to serial form and transferring it to a recording circuit, and a DMA controller for reading the data from the RAM and transferring it to the shift register.

3 Claims, 10 Drawing Figures

CONTROL CIRCUIT FOR MATRIX-DRIVEN RECORDING

BACKGROUND OF THE INVENTION

This invention relates to control circuits for matrix drive recording in a dot printer and particularly to a control circuit suitable for various desirable dot-print patterns under a print scheme of matrix-driven printing heads.

A conventional control circuit for matrix drive recording often employs a minimum number of drive circuits for the matrix, that is $2\sqrt{N}$ drive circuits for a square matrix having the square root of N as one side where N is the number of recording heads.

There has been proposed a use of a modified matrix combination for speeding-up of the total system utilizing a low-speed recording unit such as heat-sensitive recording means, for example, use of (l, m, n) combination type drive circuits for a matrix of (l, m, n) arrangement.

However, in order to prevent the conspicuous discontinuity of recording in this matrix arrangement, there is used a method of further modifying the combination.

A conventional method of modifying the matrix combination will be described with reference to FIGS. 1 to 3.

FIG. 1 is a circuit diagram of recording heads connected in a modified matrix arrangement, and FIG. 2 shows an example in which the discontinuity of recording is improved by use of the circuit arrangement of FIG. 1, and FIG. 3 shows an example of a conventional recording control circuit.

In FIG. 1, the circuit arrangement has $5\times3\times2$, namely 30 heat-generating elements for the (l, m, n) matrix where $l=5$, $m=3$ and $n=2$. Referring to FIG. 1, there are shown heat generating elements 11 ($11_1$ to $11_3$) picture image input terminals 13 ($13_1$ to $13_6$), and common electrodes 12 ($12_1$ to $12_{10}$) of 3 heat generating elements. If a recorded picture as shown in FIG. 2 is produced by the recording heads in FIG. 1, the discontinuity of recording in the scanning line becomes inconspicuous. In other words, if the left 5 blocks in FIG. 1 start to record in turn from the leftmost block and at the same time the right 5 blocks similarly start to record in turn from the rightmost block, the line as shown in FIG. 2 is recorded.

FIG. 3 shows an embodiment of a recording control circuit for causing such a recording operation.

Referring to FIG. 3, numeral 22 represents a recording head with common electrodes 27 to which the output from an oscillator 23 is applied through decoders 25a and 25b and drivers 26a and 26b, and with picture signal terminals 21 to which each of two halves of a signal corresponding to one scanning line, from a picture signal generator 15 is applied through RAMs (random access memories) 18a and 18b and shift registers 19a and 19b. RAMs 18c and 18d are supplied with the halves of the next line picture signal, respectively.

In such a circuit arrangement, first, the first half, 15 bits (first bit to fifteenth bit) of a first line picture signal (which is assumed to be formed of 30 bits) are supplied from the picture signal generator 15 to the RAM 18a and written therein, and the second half thereof, or 15 bits (sixteenth bit to thirtieth bit) are similarly written in the RAM 18b. Then, the first half, 15 bits of the next scanning line picture signal are written in the RAM 18c, and second half, or 15 bits thereof are written in the RAM 18d. While the second scanning line picture signal is being written, the first scanning line picture signal stored in the RAMs 18a and 18b is supplied by 3 bits at a time to the shift registers 19a and 19b, respectively. The contents in the shift registers 19a and 19b are supplied through drivers 20a and 20b to the picture signal input terminals 21 of the heat-sensitive heads 22, respectively.

In the first printing, three bits consisting of the first bit to third bit of the first scanning line picture signal are supplied to the shift register 19a, and at the same time three bits consisting of the 30th bit to 28th bit thereof are supplied to the shift register 19b. In the second printing, the three bits of the second block on the left half in FIG. 1 are read and the three bits of the second block on the right half are read. In this way, the line can be recorded with less steps which are more inconspicuous, as shown in FIG. 2.

The recording circuit of FIG. 3, however, is formed of a number of circuit elements and the detailed practical circuit of FIG. 3 is complicated. The conventional method of renewing the read address to the RAM in which data is recorded utilizes, for example, an up-counter suitable for a matrix arrangement, which is connected to the address input of the RAM. Thus, when a new modified matrix arrangement is used therein, it is necessary to change the control circuit for the counter and RAM, and hence, such a single-matrix arrangement circuit is limited to very few variations.

For example, Japanese Patent Application Laid-open No. 158,774/80 discloses a control circuit for matrix drive printing.

SUMMARY OF THE INVENTION

It is an object of this invention to provide a matrix-drive recording control circuit which has a simple circuit arrangement for easy change of the recorded pattern and serves to control the read and write address of the data to be recorded in a modified continuous pattern by matrix arrangement.

In accordance with one embodiment of this invention, there is provided a matrix drive recording control circuit having a shift register for converting the data to be recorded from parallel to serial form for the purpose of transferring the data to a recording circuit, an RAM for storing data to be recorded, a DMAC (direct memory access controller) for transferring the data in the RAM to the shift register, and a data editing circuit provided at the address signal input portion of the RAM for storing the data to be recorded.

More specifically, the RAM is included in a microprocessing unit (MPU) and stores regularly the data to be recorded, the DMAC has a function of specifying the address to the RAM and writing data thereat through an address bus in addition to the function of transferring the data to the shift register after parallel-to-serial (P/S) conversion, and the address for selecting data to be recorded is converted in the editing circuit only when the data is read, P/S-converted and transferred to the shift register, whereby the object of the invention can be achieved.

In another embodiment of this invention, parallel data in the RAM may be transferred to a recording circuit without parallel-serial conversion.

DESCRIPTION OF THE PREFERRED EMBODIMENTS

One embodiment of the invention will be described with reference to FIGS. 7 to 10.

Figure 6:
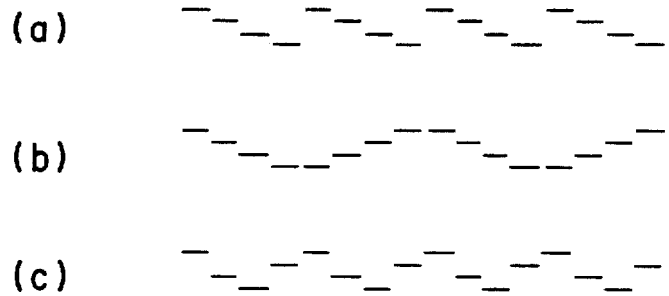
FIG. 6 schematically shows recorded states of data.
Figure 7:
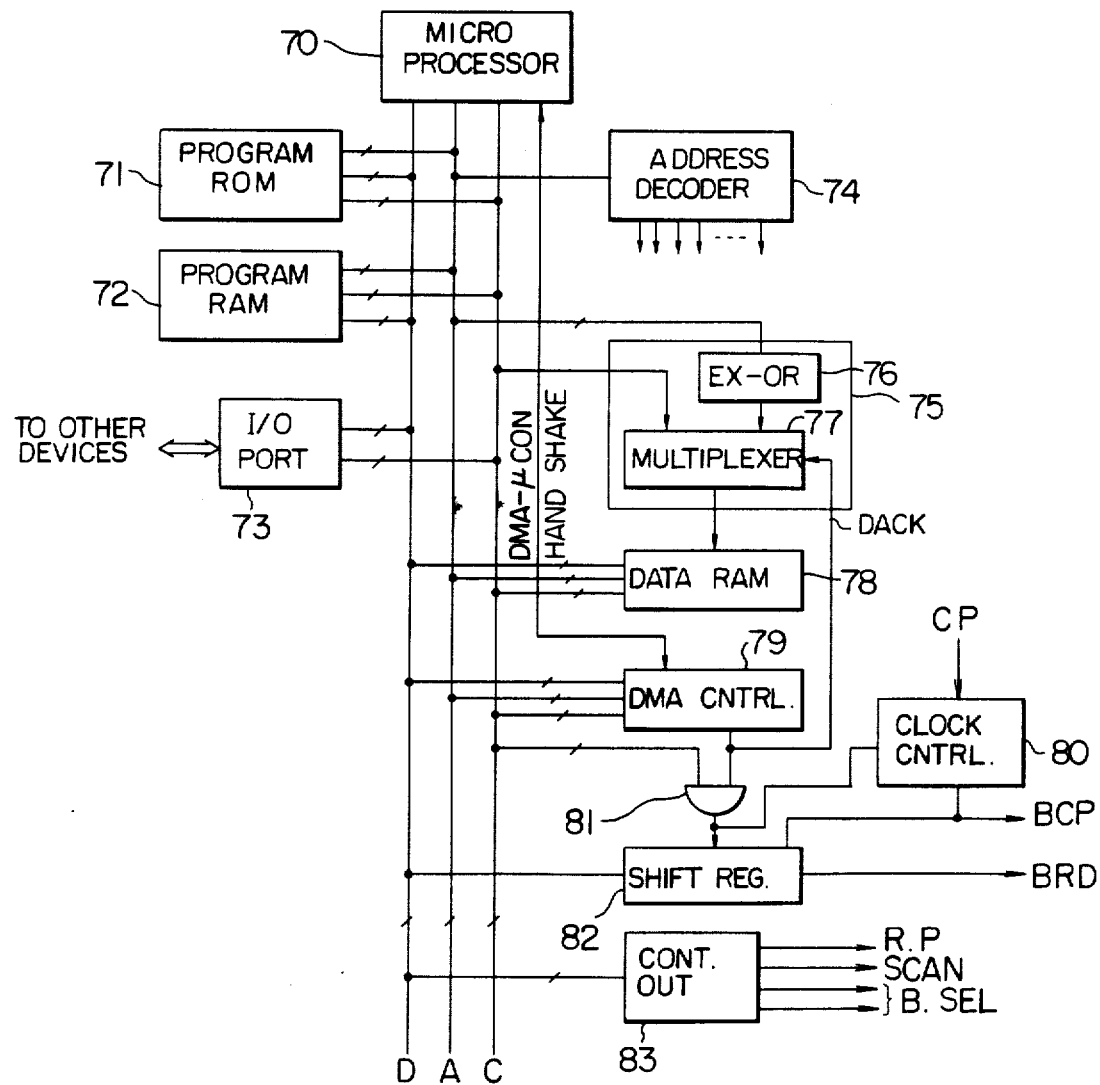
FIG. 7 is a block diagram of a recording control circuit with an MPU regarding one embodiment of this invention.
Figure 8:
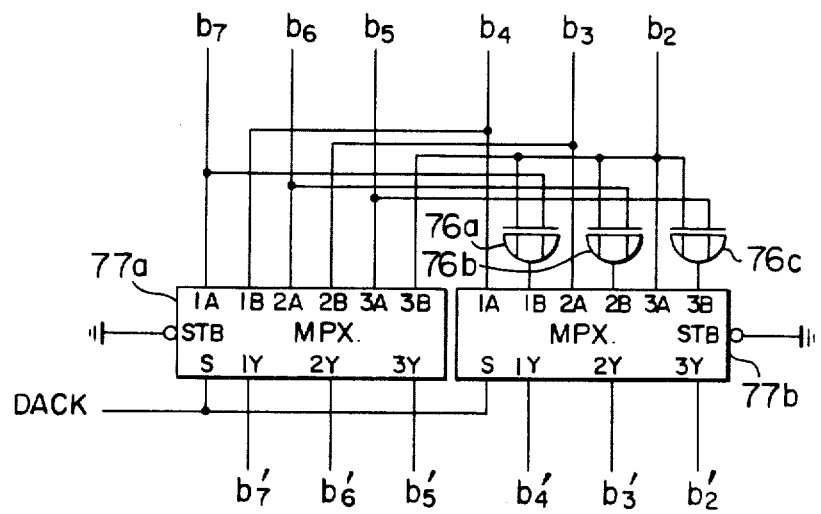
FIG. 8 is a circuit diagram of one example of the editing circuit in the embodiment of FIG. 7.
Figure 9:
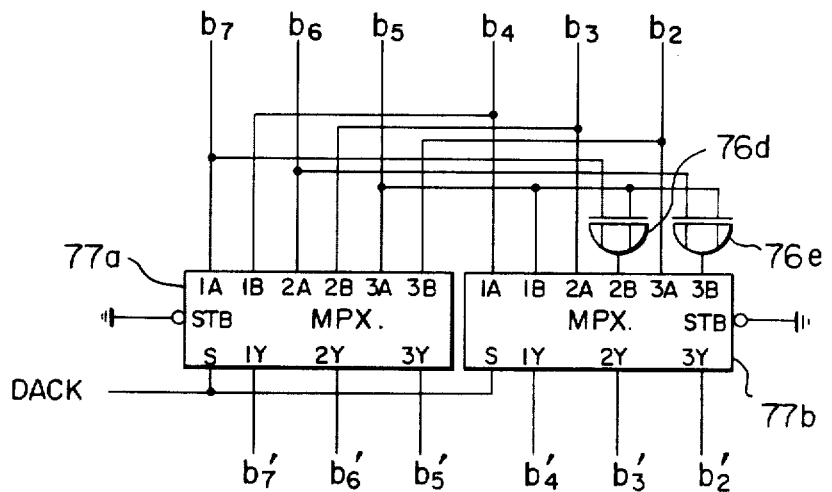
FIG. 9 is a circuit diagram of another example of the editing circuit.
Figure 10:
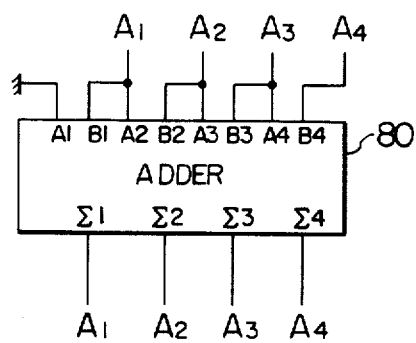
FIG. 10 is a circuit diagram of still another example of the editing circuit.

FIG. 7 is a block diagram of an MPU recording control circuit relating to one embodiment of this invention, FIG. 8 is a circuit diagram of one example of an editing circuit for the recorded patterns as shown by FIGS. 6(b) and 6(c), in the embodiment of FIG. 7, FIG. 9 is a circuit diagram of another example of the editing circuit and FIG. 10 is a circuit diagram of still another example of the editing circuit.

FIG. 7 shows an example of a control circuit for matrix drive recording to which this invention is applied. This control circuit is connected to the drive circuit shown in FIG. 4 or 5. Reference numeral 70 represents a microprocessor, 71 a program storing ROM (read-only memory), 72 a RAM (random access memory) for program, 73 a general-purpose I/O (input-/output circuit) for supplying control information or other record information to a record control circuit, and 74 an address decoder connected to buses D (data), A (address) and C (control) that are connected to the microprocessor 70. The address decoder 74 forms a signal for selection of the general-purpose I/O 73, program storing ROM 71, and program RAM 72.

The microprocessor 70, ROM 71, RAM 72, I/O 73, and decoder 74 as main elements constitute a common MPU (microprocessing unit).

Reference numeral 78 represents a data RAM for storing data formed by the MPU, 79 a DMAC (direct memory access controller) for temporarily stopping the MPU and transferring data at high speed, and 81 an AND gate which is supplied with a control signal C from the microprocessor 70 and a respond signal DACK (direct memory access acknowledge) resulting from DMA (direct memory access) by the DMAC 79 and produces a timing signal for writing the data from the data RAM 78 in a P/S (parallel to serial) converting shift register 82. Reference numeral 80 denotes a clock control circuit for producing a clock which drives the P/S converting shift register 82 to transfer the data to be recorded, and 83 a record control output circuit.

In addition, CP represents a reference clock, BCP a clock for transferring data BRD of one scanning line, SCAN a scan pulse signal for record initialization of one scanning line, and R.P a record pulse described previously.

Figure 1:
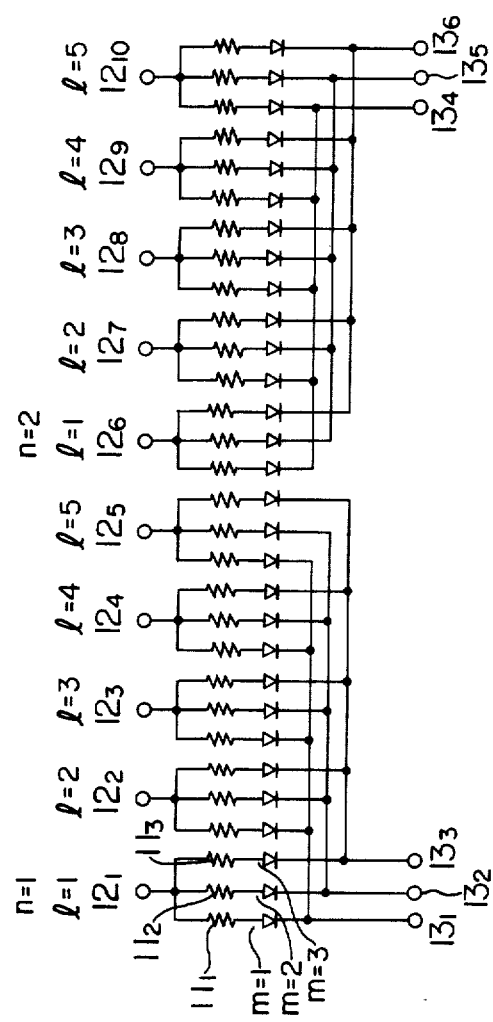
FIG. 1 is a conventional connection diagram of record or print heads of a modified matrix arrangement.
Figure 2:
FIG. 2 shows a pattern recorded by use of the circuit arrangement of FIG. 1.
Figure 3:
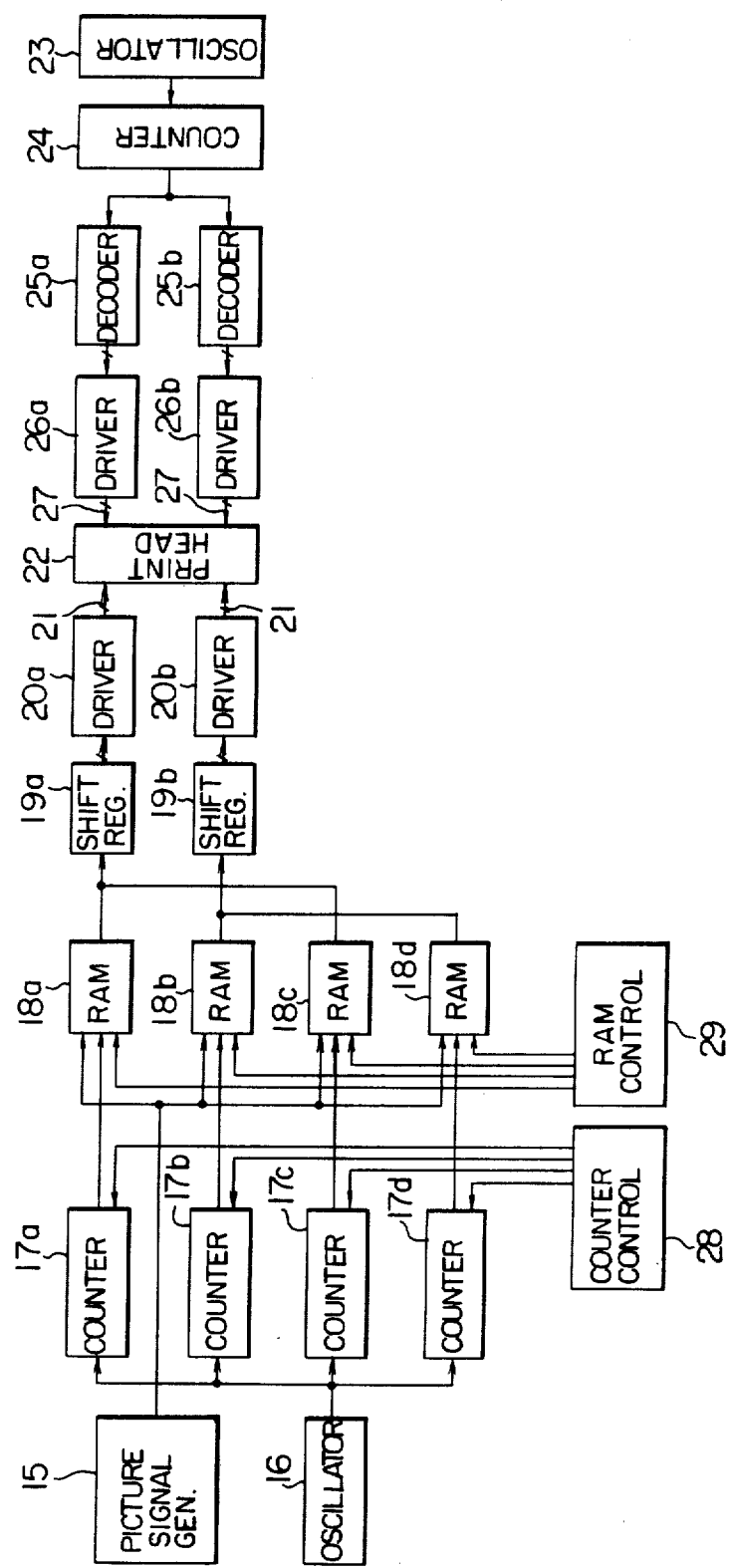
FIG. 3 shows one example of a conventional recording control circuit.
Figure 4:
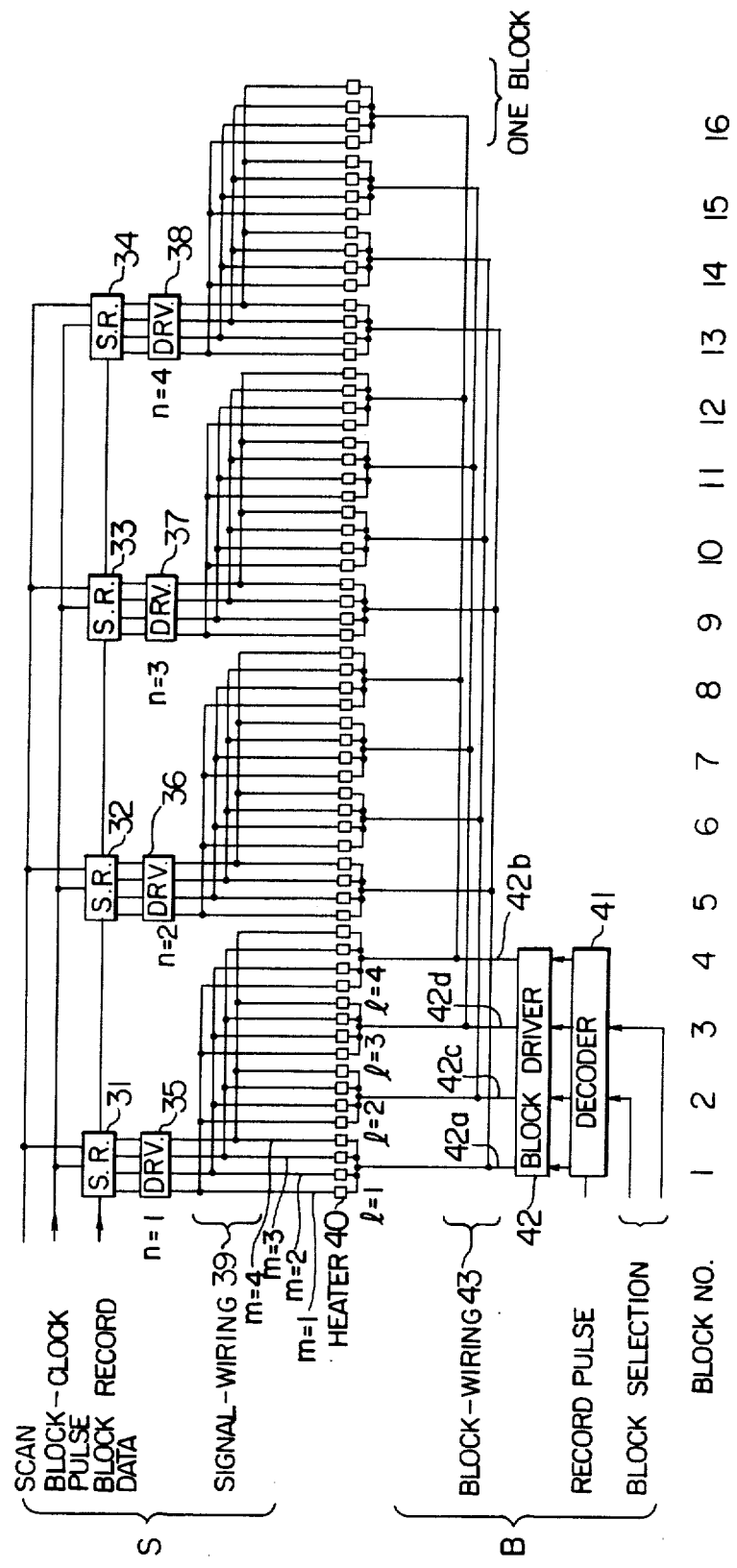
FIG. 4 is a diagram of a record-head drive circuit to which this invention is applied.
Figure 5:
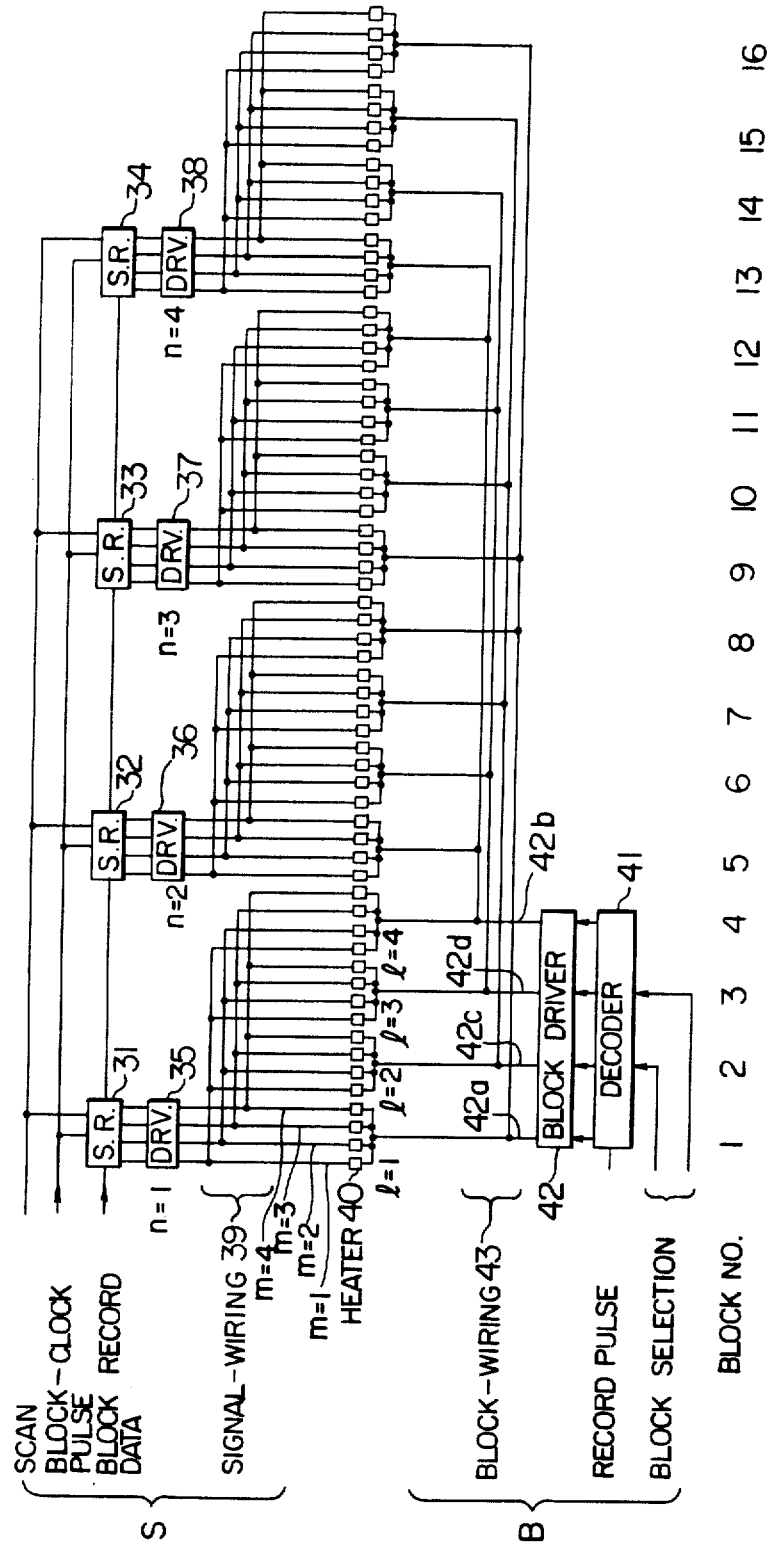
FIG. 5 is a diagram of another drive circuit to record data in a desired pattern shown in FIG. 6(b).

These signals are supplied to the recording circuit shown in FIG. 4. The BLOCK RECORD DATA is sequentially supplied to the shift registers 31 to 34 left to right at a specified timing on the BLOCK CLOCK PULSE and wait signals on the lower side, namely B-side of FIG. 4. The BLOCK SELECTION signal is used to select one of the 4 blocks connected to the drivers 35 to 38 in FIG. 4, and to record data at the timing of R.P.

Reference numeral 76 designates an exclusive OR circuit which is shown as 76a to 76e in FIGS. 8 and 9, and 77 a multiplexer relating to the signal selecting circuit which is shown as 77a and 77b in FIGS. 8 and 9.

In FIG. 7, the exclusive OR circuit 76 and multiplexer 77 constitute an editing circuit 75 which is connected to the address signal input of data RAM 78 for storing the data to be recorded. The multiplexer 77 is supplied with a signal for indicating the DMA output operation to the P/S converting circuit 82, i.e. a DACK signal for switching over the multiplexer 77 by the DMAC 79.

With such an arrangement, the microprocessor 70 causes the record control output circuit 83 to generate a scan pulse and to initialize the recording circuit. The output circuit 83 instructs the DMAC 79 to transfer the data from the data RAM 78 to the P/S converting shift register 82. In addition, only when the transfer operation is actually performed, or only when the DMAC 79 generates the DACK signal for indicating the data output operation to the P/S converting shift register 82, the address to the data RAM 78 for storing data is changed by the exclusive OR circuit 76 and multiplexer 77 so that data can be arranged according to the arranged matrix automatically at the same time as reading from the RAM.

FIG. 6 shows the recorded image produced by the record operations.

FIGS. 6a, 6b and 6c show examples of different rearrangement, and each lateral line shown in the Figures is formed of 4 record dots.

For example, in FIG. 6a, 4 groups of lines 1, 5, 9, 13; 2, 6, 10, 14; 3, 7, 11, 15; and 4, 8, 12, 16 are recorded, while in FIGS. 6b and 6c the above arrangement is changed.

FIG. 8 shows an example of an exclusive logic circuit 76a, 76b, 76c and a multiplexer 77a, 77b for carrying out the editing of a pattern like the data of matrix arrangement of l=4, m=4, n=4 shown in FIG. 6b. The matrix arrangement in this example is such that l=8, m=32, n=8, or separated n (n=8) blocks of 32 dots each are simultaneously recorded and thus 2048 dots are recorded by repeating the above recording operation l (l=8) times.

In other words, as to addresses $b_0$, $b_1$, $b_8$ and above not through the multiplexer 77a, 77b, of the addresses, the addresses by the MPU, or addresses by DMAC 79 are directly coupled to the data RAM 78.

If the exclusive OR circuits 76a, 76b and 76c are disconnected therefrom and addresses $b_5$, $b_6$, $b_7$, $b_2$, $b_3$, $b_4$ are directly connected to input terminals 3B to 1B associated with addresses $b'_3$ to $b'_7$, rearrangement to the pattern of FIG. 6a becomes possible.

As described above, the editing circuit may take one of two arrangements; presence or absence of one or more of the exclusive OR circuits.

FIG. 9 shows an editing circuit for performing editing of the pattern of FIG. 6c. This editing circuit operates in the same way as in FIG. 7.

The arrangements of FIGS. 8 and 9 require somewhat modification in the block-side matrix wiring 43 of the circuit arrangement of FIG. 4, that is modification in connection wiring of heat generating resistor 40 to each block, or modification of the connection to the driver 42. FIG. 4 is associated with FIG. 9. In order to record the pattern of FIG. 6c, the circuit arrangement of FIG. 9 is used, wiring being made so that the four outputs 42a to 42d of the block driver in FIG. 4 are driven in the order of 42a to 42d, and in order to record the pattern of FIG. 6b the circuit arrangement of FIG. 8 is used, wiring being made so that the four outputs of the block driver are driven in the order of 42a, 42c, 42d, 42b.

Modified matrix recording for electrostatic recording is another application of this invention.

The editing in this case is performed by simply adding address data. If, for example, blocks are to be recorded in the order of first block, fourth block, seventh block, and so on, the adding circuit shown in FIG. 10 is substituted into the editing circuit 75 to easily attain this recording.

Thus, in accordance with this invention, by addition of a simple circuit of the invention to the normal MPU control circuit it is possible to obtain a circuit for controlling a modified matrix.

We claim:

1. A control circuit for matrix drive recording comprising:
   a microprocessor;
   an address bus and a data bus;
   a random access memory connected to said microprocessor through said address and data buses;
   a multiplexer circuit having a first address input connected to said address bus to receive a first address and a second address input connected to receive a second address and having an address output connected to said random access memory for changing over said first and second addresses to said random access memory;
   an exclusive OR circuit having a plurality of two-input exclusive OR gates, each output of which is connected to supply a predetermined input address bit of said second address from said address bus to said multiplexer circuit, one of the two inputs of said plurality of exclusive OR gates being connected to receive one among a plurality of bits of said address bus and the other of said two inputs being connected to receive a respective one of the other bits of said address bus;
   a shift register connected to said data bus for inputting parallel data from said random access memory and for shifting the data sequentially to provide the data in series; and
   a direct memory access controller connected to said address bus for controlling data transfer from said random access memory to said shift register and for providing an acknowledge signal to said multiplexer to control the change over of said multiplexer circuit at the time of said data transfer.

2. A control circuit according to claim 1, wherein said address bus carries at least eight bits designated zero to seven and said exclusive OR circuit comprises three exclusive OR gates, one input of each of said three gates being connected to the three bits five to seven of said address bus, respectively, and the other input of said three gates being connected in common to bit two of said address bus.

3. A control circuit according to claim 1, wherein said address bus carries at least eight bits designated zero to seven and said exclusive OR circuit comprises two exclusive OR gates, one input of each of said two gates being connected to the two bits six and seven of said address bus, respectively, and the other input of said gates being connected in common to bit five of said address bus.

* * * * *